(12) United States Patent
Ng

(10) Patent No.: US 7,066,418 B2
(45) Date of Patent: Jun. 27, 2006

(54) COMBINED PEPPER GRINDER AND SALT SHAKER

(75) Inventor: Hong Wo Ng, Tsuen Wan (HK)

(73) Assignee: Wing Wo Plastic Manufactory Limited, Tsuen Wan (HK)

( * ) Notice: Subject to any disclaimer, the term of this patent is extended or adjusted under 35 U.S.C. 154(b) by 89 days.

(21) Appl. No.: 10/391,591

(22) Filed: Mar. 20, 2003

(65) Prior Publication Data

US 2004/0113000 A1    Jun. 17, 2004

(30) Foreign Application Priority Data

Dec. 17, 2002   (GB) .................................. 0229374

(51) Int. Cl.
*A47J 42/04* (2006.01)
(52) U.S. Cl. .............................. 241/169.1; 241/101.1; 241/168; 241/169
(58) Field of Classification Search ............. 241/101.1, 241/168, 169, 169.1
See application file for complete search history.

(56) References Cited

U.S. PATENT DOCUMENTS

| 595,481 | A | * | 12/1897 | Jenatschke | ............... | 241/101.2 |
|---|---|---|---|---|---|---|
| 1,264,134 | A | * | 4/1918 | Quick | ...................... | 241/101.2 |
| 2,974,887 | A | * | 3/1961 | Grandinetti | ............. | 241/101.2 |
| 3,371,874 | A | | 3/1968 | Reeves et al. | | |
| 3,827,641 | A | | 8/1974 | Anderson | | |
| 4,530,470 | A | | 7/1985 | Beilstein | | |
| 4,685,627 | A | * | 8/1987 | Lee | .......................... | 241/169.1 |
| 4,844,352 | A | * | 7/1989 | Griffin | ...................... | 241/101.2 |
| 5,145,119 | A | * | 9/1992 | Lowe | ...................... | 241/169.1 |
| 5,176,329 | A | * | 1/1993 | De Coster et al. | ....... | 241/169.1 |
| 5,531,389 | A | | 7/1996 | Husted | | |
| 5,785,264 | A | * | 7/1998 | Yang | ........................ | 241/169.1 |
| 5,897,067 | A | | 4/1999 | Tardif et al. | | |
| 6,443,377 | B1 | | 9/2002 | Cheng | | |
| 6,793,168 | B1 | | 9/2004 | Pedersen | | |
| 2004/0069881 | A1 | | 4/2004 | Arduini | | |

FOREIGN PATENT DOCUMENTS

| GB | 794560 | 5/1958 |
|---|---|---|
| GB | 1 467 588 | 3/1977 |
| GB | 2 263 074 | 7/1993 |
| GB | 2 352 411 | 1/2001 |
| GB | 2 364 937 | 2/2002 |
| GB | 2 379 622 | 3/2003 |

\* cited by examiner

OTHER PUBLICATIONS

U.S. Appl. No. 10/391,590, filed Mar. 20, 2003, Ng.

*Primary Examiner*—Derris H. Banks
*Assistant Examiner*—Jason Y. Pahng
(74) *Attorney, Agent, or Firm*—Leydig, Voit & Mayer, Ltd.

(57) ABSTRACT

A pepper grinder includes pepper and salt containers. The pepper container has first and second openings, through which first opening the container may be refilled with pepper seeds, and includes a pepper grinding mechanism in the second opening, through which ground pepper may be dispensed. The salt container has first and second openings, through which first opening the container may be refilled with salt and through which second opening salt may be dispensed. The two containers are releasably interconnected at their first openings, whereby both openings are closed. A coupler releasably connects the two containers together, which has a first part releasably connected to the pepper container first opening and a second part releasably connected to the salt container first opening.

19 Claims, 7 Drawing Sheets

COMBINED PEPPER GRINDER AND SALT SHAKER

The present invention relates to a pepper grinder.

BACKGROUND OF THE INVENTION

The grinding mechanism of most pepper grinders is adjustable so as to provide different grinding sizes. In a known construction of the rotary grinding type, the adjustment is enabled by a disc that can be turned like a dial by its rim, which is however inconvenient to use.

The subject invention seeks to provide an improved pepper grinder incorporating a grinding mechanism whose grinding size can more easily be adjusted.

SUMMARY OF THE INVENTION

According to the invention, there is provided a pepper grinder comprising a bottle for containing pepper seeds, the bottle having first and second openings, through which first opening the bottle may be refilled with pepper seeds. A pepper grinding mechanism is provided in the second opening of the bottle, through which pepper ground by the grinding mechanism may be dispensed. The grinding mechanism comprises a female grinding member and a male grinding member supported co-axially in the female grinding member for rotation relative thereto for grinding pepper, the two members being spaced apart by an annual gap in which pepper is to be ground. The grinding mechanism includes a positioning ring in engagement with the male grinding member and supported for turning to adjust the axial position of the male grinding member relative to the female grinding member and hence the width of the gap and in turn the pepper grinding size. The positioning ring comprises a ring body and a cross member that extends across opposite sides of the ring body for engagement by a user to turn the positioning ring.

Preferably, the cross member extends substantially radially across opposite sides of the ring body.

More preferably, the cross member extends substantially diametrically across opposite sides of the ring body.

It is preferred that the positioning ring includes a protruding central boss in co-axial engagement with the male grinding member, the boss being connected by the cross member to the ring body.

Preferably, the cross member comprises a plurality of equiangularly spaced spokes.

More preferably, the cross member comprises two diametrically extending spokes.

In a specific construction, the grinding mechanism includes a central operating shaft having an end extending through and in engagement with the male grinding member for rotating it, and the boss includes a central hole accommodating the shaft end.

It is preferred that the grinding mechanism includes a spring resiliently biasing the male grinding member against the positioning ring.

More preferably, the inter-engageable means comprises two fixed members engageable with each other through relative turning.

In a preferred embodiment, the grinding mechanism includes a base ring supporting the positioning ring co-axially for turning through screw-thread engagement.

More preferably, the positioning ring and the base ring have co-operable screw threads for engagement and include inter-engageable parts to define a plurality of predetermined angular positions for the positioning ring relative to the base ring.

Further more preferably, the inter-engageable parts are provided at the screw threads of the positioning ring and the base ring respectively.

Yet further more preferably, the inter-engageable parts comprise a protrusion and recesses corresponding to the predetermined positions.

Advantageously, the base ring includes indicia to indicate the predetermined positions of the positioning ring.

In a preferred arrangement, the positioning ring has four equiangular predetermined positions relative to the base ring.

Conveniently, the positioning ring is arranged to be turned through an angle smaller than 360°.

BRIEF DESCRIPTION OF DRAWINGS

The invention will now be more particularly described, by way of example only, with reference to the accompanying drawings, in which:

FIGS. 7 and 7A are perspective and cross-sectional side views of a male grinding member of FIG. 4;

FIGS. 8 and 8A are assembled and exposed perspective views of a lower unit of the grinding mechanism of FIG. 4;

FIGS. 9 and 9A are bottom plan and cross-sectional side views of the grinding mechanism of FIG. 3, in one operating condition providing a fine pepper grinding size; and FIGS. 10 and 10A are bottom plan and cross-sectional side views corresponding to FIGS. 9 and 9A, in another operating condition providing a coarse pepper grinding size.

DETAILED DESCRIPTION OF PREFERRED EMBODIMENT

Figure 1:
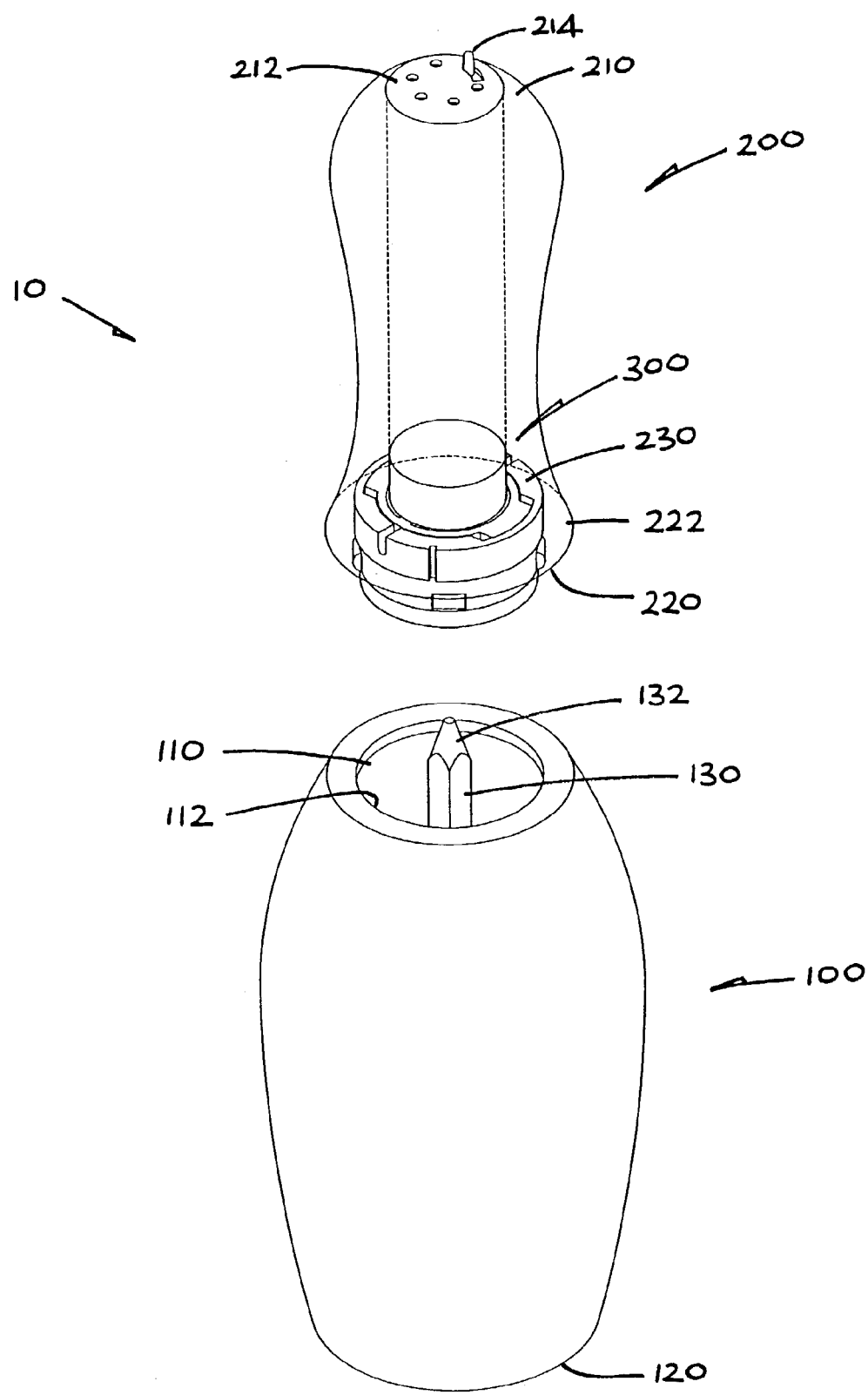
FIG. 1 is a perspective view of an embodiment of a pepper grinder in accordance with the invention, said grinder having a pepper bottle and an upper handle for operating a pepper grinding mechanism provided in the bottom of the bottles

Referring to the drawings, there is shown a pepper grinder 10 embodying the invention, which comprises a plastic upright bottle (body) 100 for containing pepper seeds, a plastic upright handle 200 (or any turning knob) connectable co-axially atop the bottle 100, and a grinding mechanism 300 in the bottle 100. The handle 200 may be made to contain and dispense salt, and includes a plastic coupler 210 at its lowermost end for releasable connection with the bottle 100. The bottle 100 and handle 200 when connected together resemble a bowling pin, between which the coupler 210 is concealed.

The bottle 100 has opposite circular open top and bottom ends 110 and 120. The top end 110 acts as a mouth 110, through which the bottle 100 may be refilled with pepper seeds. The mouth 110 has a peripheral wall 112 that converges upwards. The coupler 210 acts like a plug insertable into the bottle mouth 110, which includes four protruding knobs 212 equiangularly around its periphery.

The knobs 212 are resiliently biased outwards and act as latches for, upon insertion, engaging behind the bottle mouth wall 112 through a snap action, thereby connecting the handle 200 to the bottle 100. As the knobs 212 are round on both upper and lower sides, the handle 200 can be plugged to and unplugged from the bottle 100 at will. Given that the mouth 110 is circular, the handle 200 can rotate freely relative to the bottle 100 about their common vertical axis.

The grinding mechanism 300 is installed inside the bottom end 120 of the bottle 100, through which pepper ground by the mechanism 300 may be dispensed. The grinding mechanism 300 has a metal central operating shaft 310 that extends upwards through the bottle 100 with its top end 311 protruding slightly out of the mouth 110. The shaft 310 has a square cross-section, whose top end 311 is engaged by a matching square central hole of the coupler 210, such that the shaft 310 can be turned by the handle 200 to operate the grinding mechanism 300.

The grinding mechanism 300 includes an inverted U-shaped plastic bracket 320 supporting the shaft 310, a stationary plastic top ring 330 locating the bracket 320, and a stationary plastic base ring 340 fixed with the top ring 330, all being co-axially inter-engaged. A plastic positioning ring 350 is co-axially engaged within the base ring 340 through respective screw threads, and a plastic spacer ring 360 is placed co-axially on the positioning ring 350. The top ring 330 also co-axially locates a porcelain female grinding member 370, co-axially within which a porcelain male grinding member 380 is positioned.

Figure 5A:
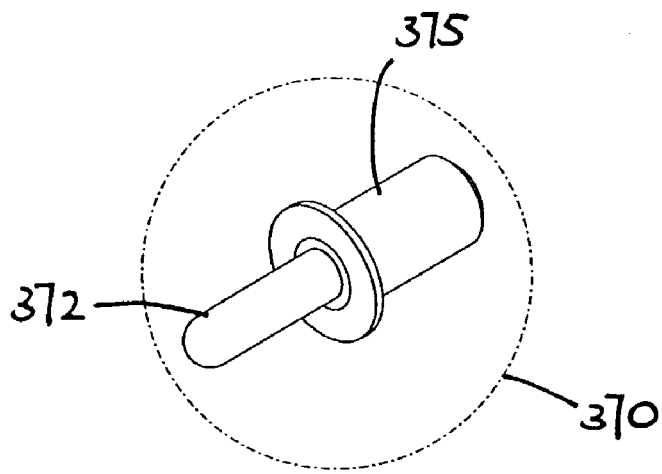
FIGS. 5 and 5A are assembled and exposed perspective views of an upper unit of the grinding mechanism of FIG. 4, including a female grinding member.

The top ring 330, bracket 320 and female grinding member 370 constitute an upper unit 300A (FIGS. 5 and 5A). The top ring 330 has a collar 331 and an annual peripheral flange 336 around the waist of the collar 331. The collar 331 has an upper part 332 and a slightly enlarged lower part 333 forming an internal annual corner 334 with the upper part 332, in which a pair of diametrically apposite knobs 335 is formed. The bracket 320 has a bridge 321 including a circular central hole 322 and a pair of legs 323 depending from opposite ends of the bridge 321. Each leg 323 has a foot 324.

The female grinding member 370 (FIGS. 6 and 6A) has a generally cylindrical body 371 and an annual peripheral flange 372 around the bottom of the body 371. The flange 372 has a pair of diametrically opposite cutouts 373. An L-shaped recess 374 is formed on the adjoining outer and upper surfaces of the body 371 and flange 372 respectively, on each of diametrically opposite sides thereof. The inner surface of the body 371 has frustoconically shaped upper and lower parts converging towards each other, on which respective slightly skewed teeth 375 and 376 are formed. The upper teeth 375 are relatively coarse for drawing in and crushing pepper seeds, whereas the lower teeth 376 are relatively fine for subsequently grinding the crushed seeds.

For assembly, the bracket 320 is located with its feet 324 in respective recesses 374 of the female grinding member 370, both of which are then inserted from below into/through the top ring 330. The grinding member 370 is jammed as a push-fit wholly into the collar 331 of the top ring 330, thereby clamping the bracket 320 by its legs 323, with the cutouts 373 engaging the knobs 335 to prevent relative rotation.

The male grinding member 380 (FIGS. 7 and 7A) has a generally bell-shaped body 381, whose outer surface has upper and lower parts, on which respective skewed teeth 385 and 386 are formed. The upper teeth 385 are rather coarse for drawing in and crushing pepper seeds, whereas the lower teeth 386 are much finer for subsequently grinding the crushed seeds. The body 381 includes a square central hole 382 having an enlarged lower end.

The shaft 310 and male grinding member 380 constitute a middle unit 300B, in that the shaft 310 passes from below through the central hole 382 of the grinding member 380. The grinding member 380 is retained on a flanged bottom end 312 of the shaft 310, through a plastic bush, 383. By reason of the engagement between its square hole 382 and the square cross-section of the shaft 310, the male grinding member 380 is rotatable by the shaft 310. A compression coil spring 384 is disposed on the shaft 310, which rests on the grinding member 380 and is followed by a washer 387.

In order to assemble the two units 300A and 300B together, the shaft 310 is inserted upwardly through the top ring 330, the female grinding member 370 and the bridge 321 of the bracket 320 until the male grinding member 380 enters fully into the female grinding member 370, all in a co-axial manner. The shaft 310 is then retained by C-clip 388 fitted at a position immediately above the bracket 320. The spring 384 co-acts between the bridge 321 above and the male grinding member 380 below, thereby resiliently biasing the male grinding member 380 outwardly of the female grinding member 370.

The male grinding member 380 remains generally within the female grinding member 370, together forming an annual, or more specifically double frusto-conical, gap for crushing and grinding pepper seeds.

The base ring 340, positioning ring 350 and spacer ring 360 constitute a lower unit 300C (FIGS. 8 and 8A). The base ring 340 is in the from of a cylindrical collar 341 having, on and around its thickened inner peripheral surface 342, an integral rib 343. The rib 343 extends co-axially with the collar 341 in a flat helical manner over almost one complete turn, and includes four shallow recesses 344 equiangularly on its upper side. The rib 343 acts as a screw thread, including a step 345 formed between its upper and lower ends.

The positioning ring 350 has, on and around the outer peripheral surface of its ring body, an integral rib 351 that extends co-axially with the ring 350 in a flat helical manner over about one and a half turn. The rib 351 acts as a screw thread, including a thickened part 352A on its lower side at about half a turn from its upper end and another thickened part 352B on its upper side slightly downstream of the lower thickened part 352A. The ring 350 includes a hollow cylindrical central boss 353 connected thereto by an integral cross member in the form of a pair of diametrically extending spokes 355, each spoke 355 having a stepped outer end 356. The boss 353 protrudes upwardly from the plane of the ring 350, having an open top end 354 as defined by a central hole therein.

For assembly, the positioning ring 350 is co-axially engaged within the base ring 340 through respective screw threads 351 and 343, such that the inner ring 350 can be turned in either direction relative to the outer ring 340. For turning, a user should insert his/her thumb and index finger into respective halves of the positioning ring 350 from below to grasp the two spokes 355 and then turn clockwise to screw the positioning ring 350 upwards into the base ring 340 or anti-clockwise to unscrew it downwards.

The upper thickened part 352B of the inner screw thread 351 serves to abut with the step 345 of the outer screw thread 343, thereby preventing over-unscrewing and hence separation of the positioning ring 350 from the base ring 340.

The lower thickened part 352A of the inner screw thread 351 acts as a snap protrusion releasably engageable with any one of the four recesses 344 of the outer screw thread 343, thereby defining four equiangular positions of the positioning ring 350 relative to the base ring 340.

The spacer ring 360 is a simple flat cylindrical collar, having a slightly smaller diameter than the positioning ring 350. It is located co-axially and partially in the positioning ring 350, embracing the spokes 355 by their outer end steps 356. The spacer ring 360 serves to prevent over-screwing of the positioning ring 350 into the base ring 340 and hence dislodgment thereof internally.

For assembly, the upper unit 300A, including the middle unit 300B, is lowered onto the lower unit 300C, such that the lower collar part 333 of the top ring 330 is inserted co-axially into the collar 341 of the base ring 340. In doing so, the central boss 353 of the positioning ring 350 abuts from below, via the bush 383, the male grinding member 380 through the enlarged lower end of its central hole 382. The male grinding member 380 is thus pushed upwardly slightly further into the female grinding member 370, against the action of the spring 384.

The flange 336 of the top ring 330 is then secured with the upper rim of the base ring body 341 by glue for example, whereby the upper and lower units 300A and 300C including the middle unit 300E are assembled together. The resulting assembly 300A–C, or the grinding mechanism 300, is subsequently inserted from below fully into the bottom end 120 of the grinder bottle 100 and is finally secured therein by glue for example.

The positioning ring 350 is supported by the base ring 340 for relative upward and downward movement through screwing engagement between their ribs 351 and 343. In turn, the positioning ring 350 upwardly supports, by its protruding central boss 353, the male grinding member 380 in a spaced-apart relationship within the female grinding member 370, against the action of the spring 384. Thus, adjustment of the vertical position of the positioning ring 350 will result in adjustment of the frusto-conical gap width between the lower teeth 386 and 376 of the two grinding members 380 and 370, thereby adjusting the granular size of the pepper ground by the teeth 386 and 376.

As described above, in order to turn the positioning ring 350, a user only needs to insert his/her thumb and index finger from below into respective halves of the ring 350 and then grasp the two spokes 355 like a winged knob. The positioning ring 350 may be turned clockwise to move slightly upwards into the base ring 340 for reducing the pepper grinding size (FIGS. 9 and 9A), or anti-clockwise to move slightly downwards for increasing the grinding size (FIGS. 10 and 10A).

Access to the spokes 355 is convenient, as they are fully exposed within the entire opening of the base ring 340 on the bottom side of the grinding mechanism 300. The protruding central boss 353 defines a space beyond the spokes 355, thereby creating a deeper room through the positioning ring 350 for insertion of the thumb and index finger to facilitate grasping of the spokes 355. Given that both spokes 355 extend radially outwards to reach the circumferential body of the positioning ring 350, extending across opposite sides thereof, the force required to turn the ring 350 can be minimized.

Advantageously, the bottom surface of the perimeter of the base ring 340 is marked with indicia to indicate the four predetermined angular positions of the positioning ring 350 and in turn the pepper grinding size (FIGS. 9 and 10). The indicia comprise an arrow 357 on one of the spokes 355 pointing outwards and dots 347 on the base ring 340 at corresponding equiangular positions, in that one dot 347 indicates the finest grinding size and four dots 347 indicate the coarsest grinding size, etc.

Given the four predetermined equiangular positions, the positioning ring 350 only needs to turn through a maximum angle of about 270°. In any event, the turning should preferably be limited to within one complete turn, i.e. smaller than 360°, so that there will be a single grinding size associated with every possible position of the adjustment ring 350.

Both spokes 355 are straight and together form a linear cross member for grasping or gripping. It is envisaged that they may be made slightly curved and/or protruding outwards to facilitate grasping.

The invention has been given by way of example only, and various other modifications and/or variations to the described embodiment may be made by persons skilled in the art without departing from the scope of the invention as specified in the accompanying claims.

The invention claimed is:

1. A pepper grinder comprising:
   a first container for pepper seeds, the container having first and second openings, through which first opening the container may be refilled with pepper seeds, and including a pepper grinding mechanism provided in the second opening, through which pepper ground by the grinding mechanism may be dispensed;
   a second container for salt, the container having first and second openings, through which first opening the container may be refilled with salt and through which second opening salt may be dispensed;
   the two containers being releasably connected together at their first openings, with the result that each first opening closes the other first opening;
   a coupler releasably connecting the two containers together, the coupler having a first part releasably connected with the first opening of the pepper container and a second part releasably connected with the first opening of the salt container.

2. A pepper grinder comprising:
   a first container for pepper seeds, the container having first and second openings, through which first opening the container may be refilled with pepper seeds, and including a pepper grinding mechanism provided in the second opening, through which pepper ground by the grinding mechanism may be dispensed;
   a second container for salt, the container having first and second openings, through which first opening the container may be refilled with salt and through which second opening salt may be dispensed;
   the two containers being releasably connected together at their first openings with the result that both first openings are closed;
   a coupler releasably connecting the two containers together, the coupler having a first part releasable connected with the first opening of the pepper container and a second part releasable connected with the first opening of the salt container, wherein the first openings of both containers have respective peripheral walls surrounding the corresponding parts of the coupler, such that the coupler is concealed within a junction between the two containers.

3. The pepper grinder as claimed in claim 1, wherein the first opening of the pepper container has a peripheral wall surrounding the first part of the coupler, and the peripheral wall and the first coupler part have inter-engageable means releasably connecting the pepper container and the coupler together.

4. The pepper grinder as claimed in claim 3, wherein the inter-engageable means comprises a fixed member and a resiliently biased movable member engageable with the fixed member through a snap action.

5. The pepper grinder as claimed in claim 4, wherein the fixed member is provided by a rim of the peripheral wall, and the movable member is supported by the first coupler part for movement and is resiliently biased to protrude from the coupler part.

6. The pepper grinder as claimed in claim 1, wherein the first opening of the salt container has a peripheral wall surrounding the second part of the coupler, and the peripheral wall and the second coupler part have inter-engageable means releasably connecting the salt container and the coupler together.

7. The pepper grinder as claimed in claim 6, wherein the inter-engageable means comprises two fixed members engageable with each other through relative turning.

8. The pepper grinder as claimed in claim 7, wherein the two fixed members are engageable with each other as a bayonet joint.

9. The pepper grinder as claimed in claim 1, wherein the connection between the salt container and the coupler is fixed against relative rotation, and the connection between the coupler and the pepper container permits relative rotation, and wherein the grinding mechanism includes an operating shaft engageable with the coupler for rotation relative to the pepper container by the coupler rotating with the salt container.

10. A pepper grinder comprising:
a first container for pepper seeds, the container having first and second openings, through which first opening the container may be refilled with pepper seeds, and including a pepper grinding mechanism provided in the second opening, through which pepper ground by the grinding mechanism may be dispensed;
a second container for salt, the container having first and second openings, through which first opening the container may be refilled with salt and through which second opening salt may be dispensed;
the two containers being releasably connected together at their first openings, with the result that each first opening closes the other first;
a coupler releasably connecting the two containers together, the coupler having, a first part releasably connected with the first opening of the pepper container and a second part releasably connected with the first opening of the salt container, wherein the coupler includes a locking member movable to lock the connection between the salt container and the coupler against release in response to making a connection between the coupler and the pepper container.

11. The pepper grinder as claimed in claim 10, wherein the grinding; mechanism includes an operating shaft engageable with the coupler for rotation relative to the pepper container by the coupler rotating with the salt container, and the locking member is movable to lock by the operating shaft upon engaging with the coupler.

12. The pepper grinder as claimed in claim 10, wherein the grinding mechanism includes an operating shaft engageable with the coupler for rotation relative to the pepper container by the coupler rotating with the salt container, and the locking member is movable by the operating shaft upon engaging with the coupler.

13. The pepper grinder as claimed in claim 12, wherein the shaft has a tapered end arranged to move the locking member through a wedging action.

14. The pepper grinder as claimed in claim 1, wherein the pepper container has an oblong upright body having an upper end as its first opening, and the salt container has an oblong upright body having a lower end as its first opening.

15. A pepper grinder comprising:
a first container for pepper seeds, the container having first and second openings, through which first opening the container may be refilled with pepper seeds, and including a pepper grinding mechanism provided in the second opening, through which pepper ground by the grinding mechanism may be dispensed;
a second container for salt, the container having first and second openings, through which first opening the container may be refilled with salt and through which second opening salt may be dispensed;
the two containers being releasably connected together at their first openings, with the result that both first openings are closed;
a coupler releasably connecting the two containers together, the coupler having a first part releasably connected with the first opening of the pepper container and a second part releasably connected with the first opening of the salt container,
wherein the coupler includes a locking member movable to lock the connection between the salt container and the coupler against release in response to making a connection between the coupler and the pepper container, and
wherein the first openings of both containers have respective peripheral walls surrounding the corresponding parts of the coupler, such that the coupler is concealed within a junction between the two containers.

16. The pepper grinder as claimed in claim 1, wherein the second openings of each container are at opposite ends of the pepper grinder.

17. The pepper grinder as claimed in claim 2, wherein the second openings of each container are at opposite ends of the pepper grinder.

18. The pepper grinder as claimed in claim 10, wherein the second openings of each container are at opposite ends of the pepper grinder.

19. The pepper grinder as claimed in claim 15, wherein the second openings of each container are at opposite ends of the pepper grinder.

* * * * *

UNITED STATES PATENT AND TRADEMARK OFFICE
CERTIFICATE OF CORRECTION

PATENT NO. : 7,066,418 B2  Page 1 of 5
APPLICATION NO. : 10/391591
DATED : June 27, 2006
INVENTOR(S) : Ng It is certified that error appears in the above-identified patent and that said Letters Patent is hereby corrected as shown below:

Please delete column 1 line 1 through column 8 line 56 and insert column 1 line 1 through column 8 line 37 as attached Signed and Sealed this Twenty-ninth Day of April, 2008

JON W. DUDAS
*Director of the United States Patent and Trademark Office*

COMBINED PEPPER GRINDER AND SALT SHAKER

The present invention relates to a pepper grinder.

BACKGROUND OF THE INVENTION

Pepper and salt are two most popular condiments that are usually available together on the table. Pepper often needs grinding from pepper seeds at the time of serving for freshness. Pepper grinders may be designed to contain and dispense salt as well, as is already known in the art.

The subject invention seeks to provide an improved pepper grinder of the type that also holds salt.

SUMMARY OF THE INVENTION

According to the invention, there is provided a pepper grinder comprising a first container for pepper seeds and a second container for salt. The pepper container has first and second openings, through which first opening the container may be refilled with pepper seeds, and includes a pepper grinding mechanism provided in the second opening, through which pepper ground by the grinding mechanism may be dispensed. The salt container has first and second openings, through which first opening the container may be refilled with salt and through which second opening salt may be dispensed. The two containers are releasably connected together at their first openings, with the result that both openings are closed. A coupler releasably connects the two containers together, which has a first part releasably connected to the first opening of the pepper container and a second part releasably connected to the first opening of the salt container.

Preferably, the first openings of both containers have respective peripheral walls surrounding the corresponding parts of the coupler, such that the coupler is concealed within the junction between the two containers.

In a preferred embodiment, the first opening of the pepper container has a peripheral wall surrounding the first part of the coupler, and the peripheral wall and the first coupler part have inter-engageable means releasably connecting the pepper container and the coupler together.

More preferably, the inter-engageable means comprises a fixed member and a resiliently biassed movable member engageable with the fixed member through a snap action.

Further more preferably, the fixed member is provided by a rim of the peripheral wall, and the movable member is supported by the first coupler part for movement and is resiliently biassed to protrude from the coupler part.

In a preferred embodiment, the first opening of the salt container has a peripheral wall surrounding the second part of the coupler, and the peripheral wall and the second coupler part have inter-engageable means releasably connecting the salt container and the coupler together.

More preferably, the inter-engageable means comprises two fixed members engageable with each other through relative turning.

Further more preferably, the two fixed members are engageable with each other as a bayonet joint.

It is preferred that the connection between the salt container and the coupler is fixed against relative rotation, and the connection between the coupler and the pepper container permits relative rotation. Also, the grinding mechanism includes an operating shaft engageable with the coupler for rotation relative to the pepper container by the coupler rotating with the salt container.

It is preferred that the coupler includes a locking member movable to lock the connection between the salt container and the coupler against release in response to making of connection between the coupler and the pepper container.

More preferably, the grinding mechanism includes an operating shaft engageable with the coupler for rotation relative to the pepper container by the coupler rotating with the salt container, and the locking member is movable to lock by the operating shaft upon engaging with the coupler.

Further more preferably, the grinding mechanism includes an operating shaft engageable with the coupler for rotation relative to the pepper container by the coupler rotating with the salt container, and the locking member is movable by the operating shaft upon engaging with the coupler.

Further more preferably, the shaft has a tapered end arranged to move the locking member through a wedging action.

In a specific construction, the pepper container has an oblong upright body having an upper end as its first opening, and the salt container has an oblong upright body having a lower end as its first opening.

BRIEF DESCRIPTION OF DRAWINGS

Figure 2:
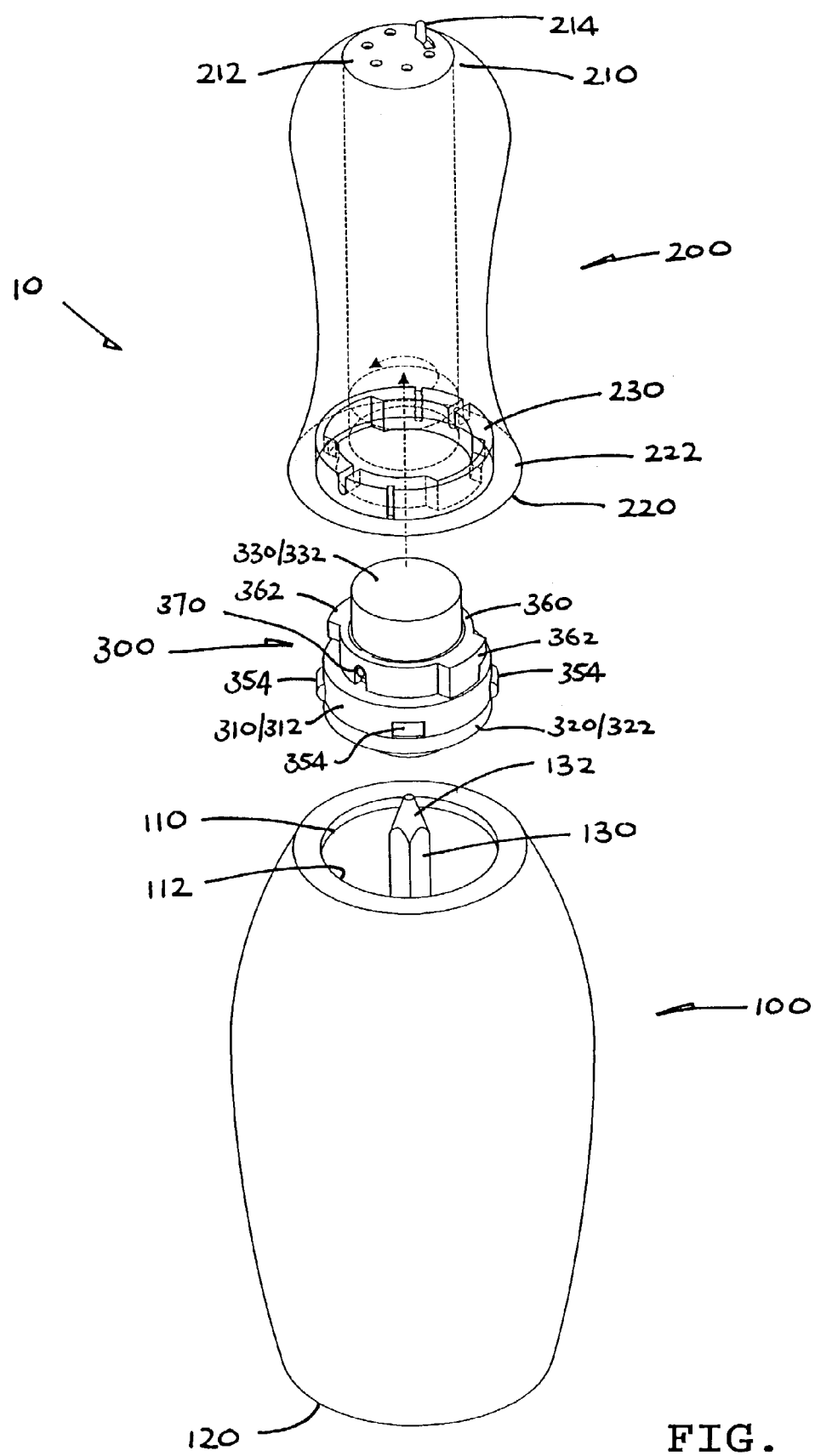
FIG. 2 is a perspective view of the bottle of FIG. 1, showing the grinding mechanism.
Figure 3:
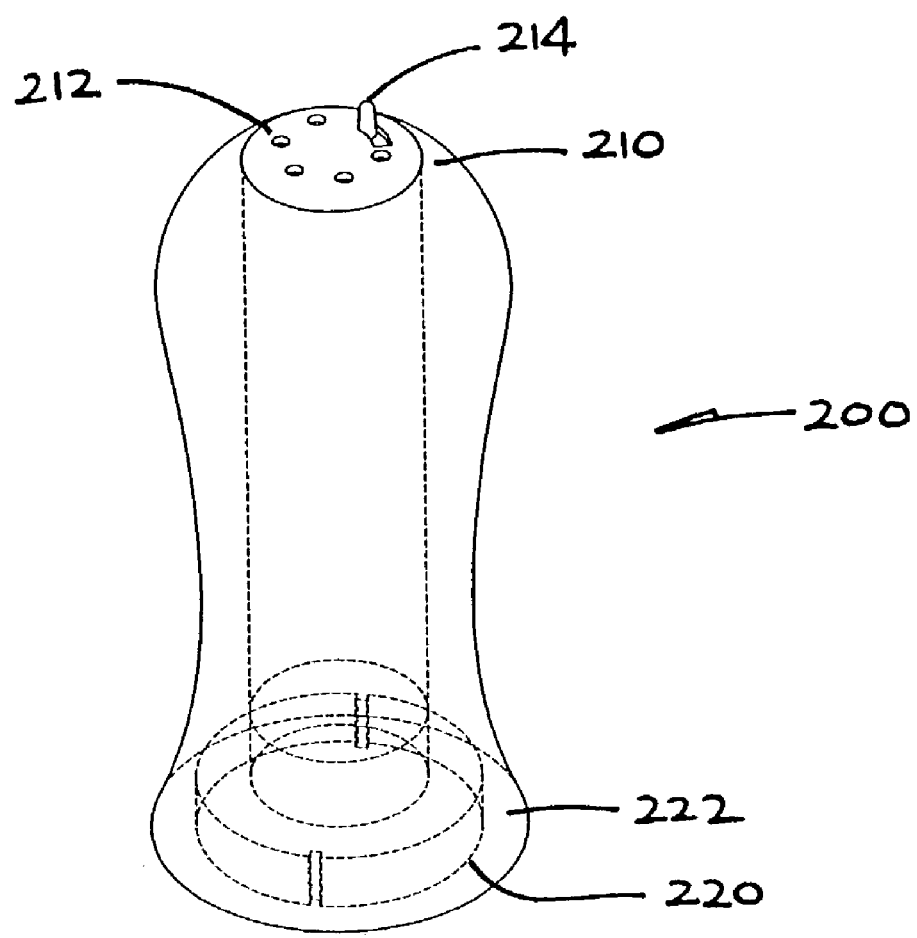
FIG. 3 is a cross-sectional side view of the bottle and grinding mechanism of FIG. 2.
Figure 3:
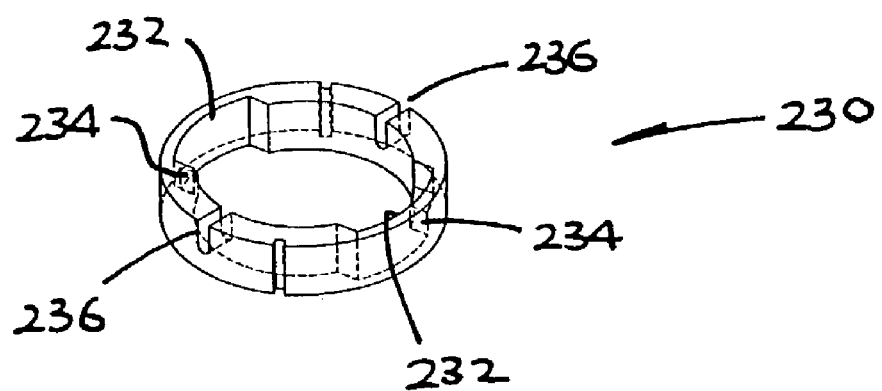
Figure 4:
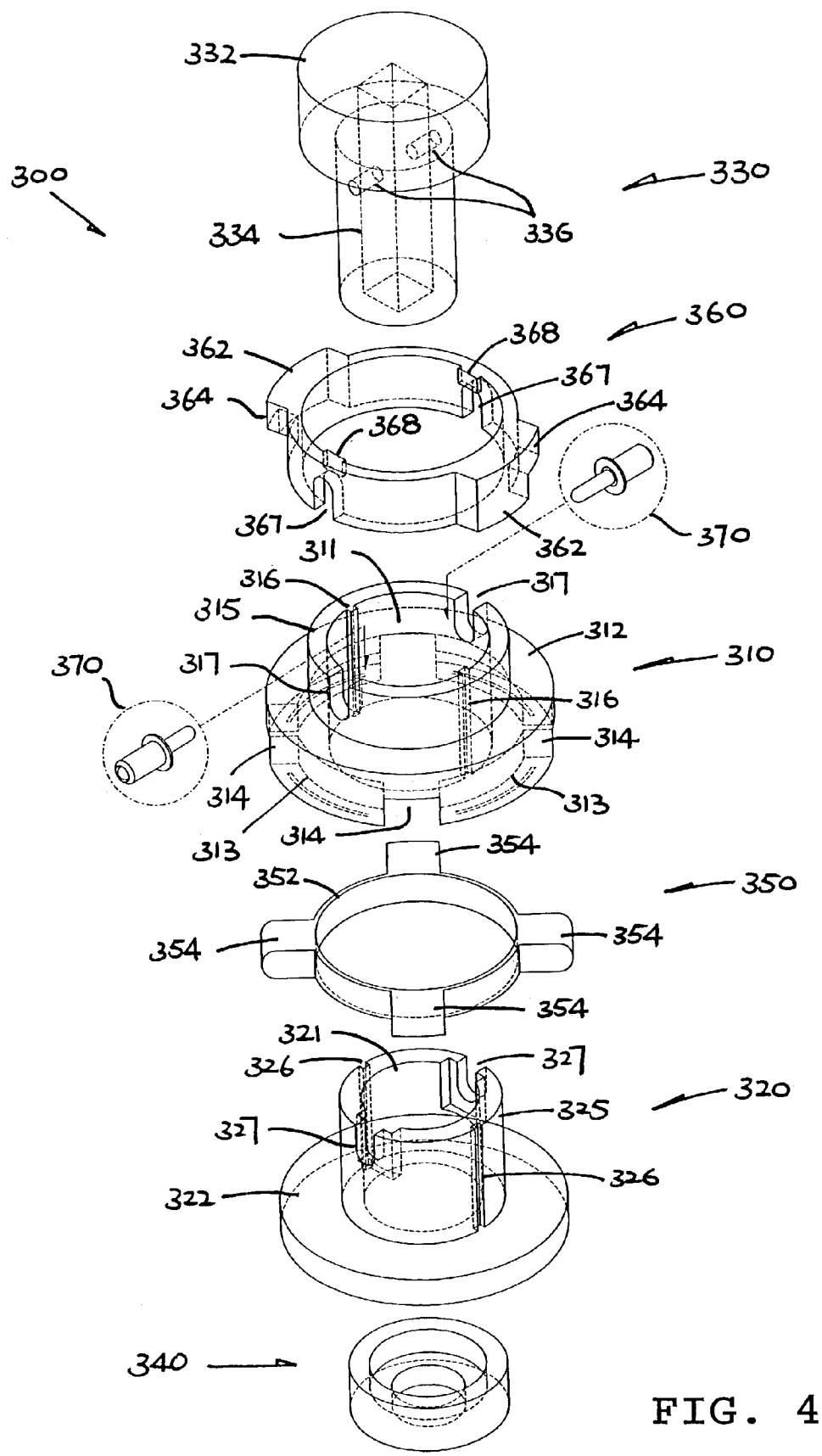
FIG. 4 is a partially exposed perspective view of the grinding mechanism of FIG. 3.
Figure 5B:
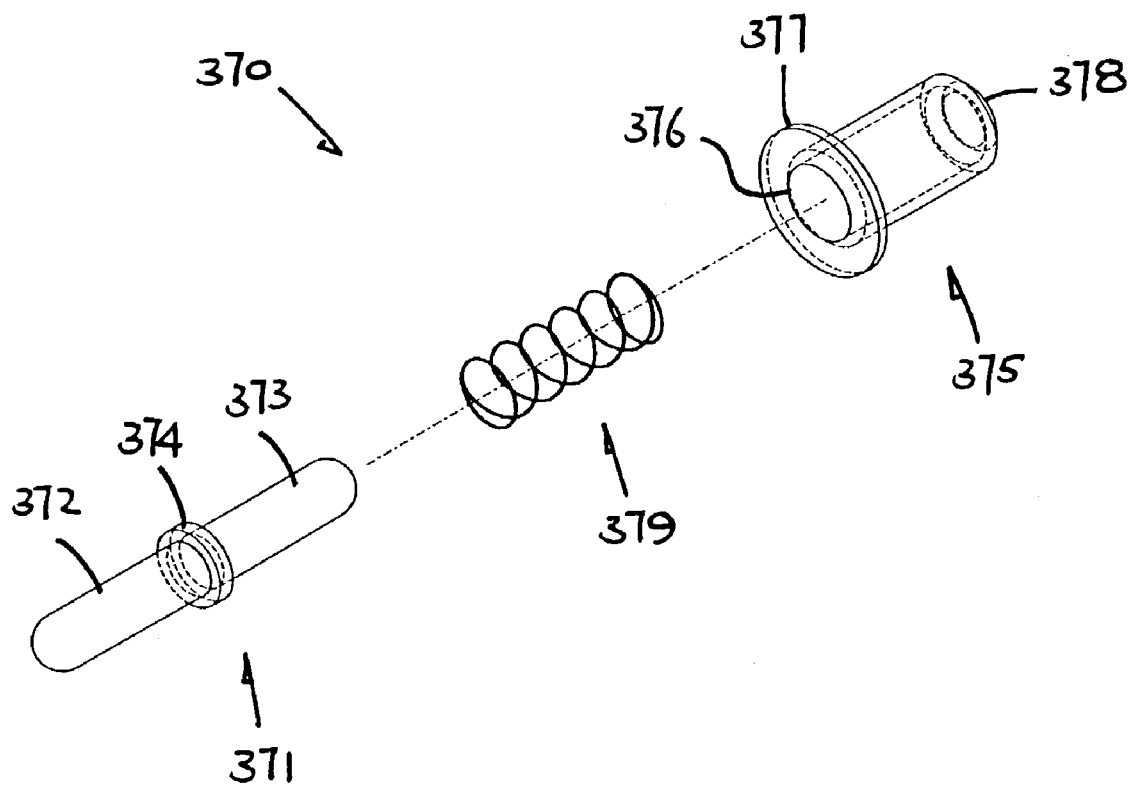
Figure 6A:
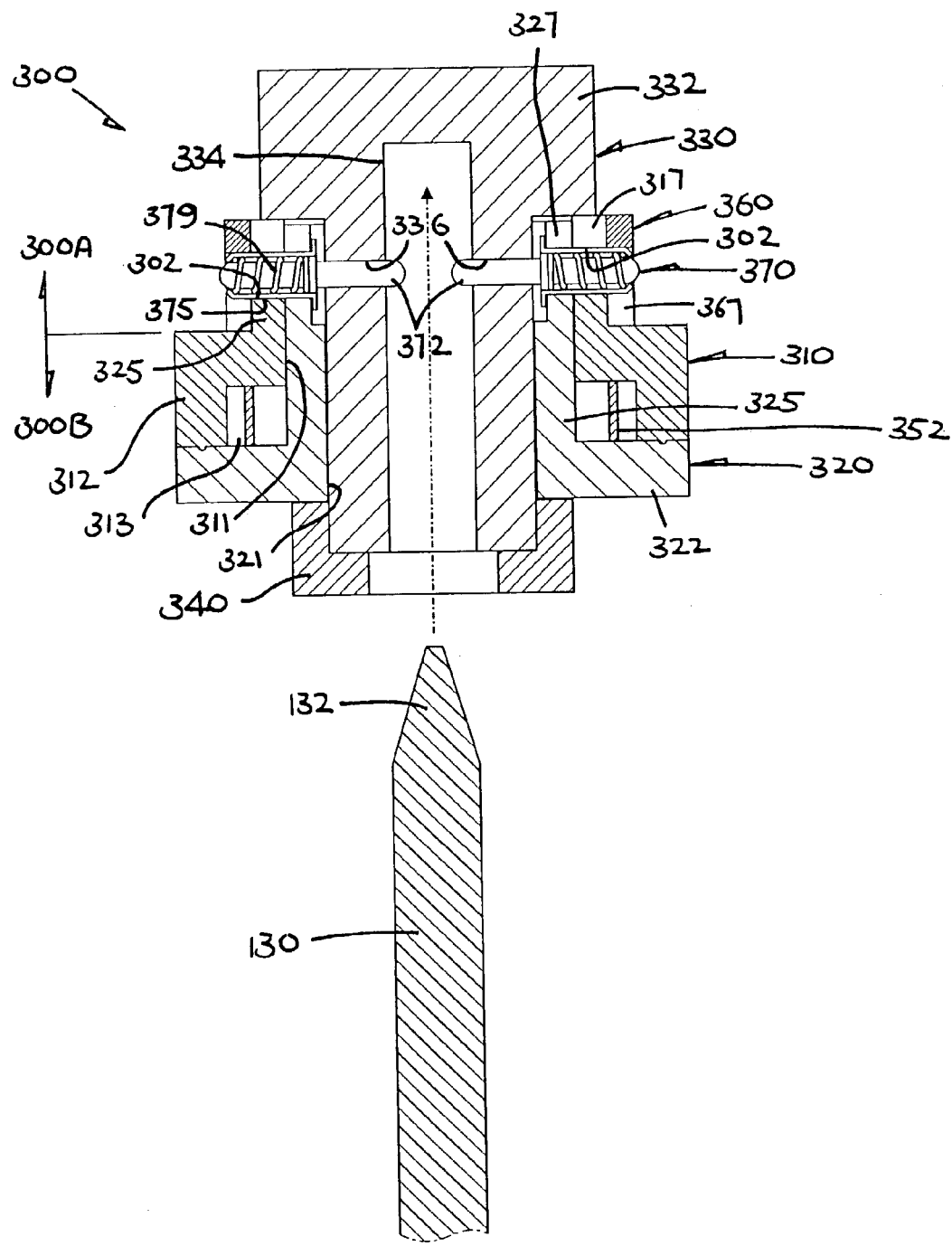
FIGS. 6 and 6A are perspective and cross-sectional side views of the female grinding member of FIG. 5A.
Figure 6B:
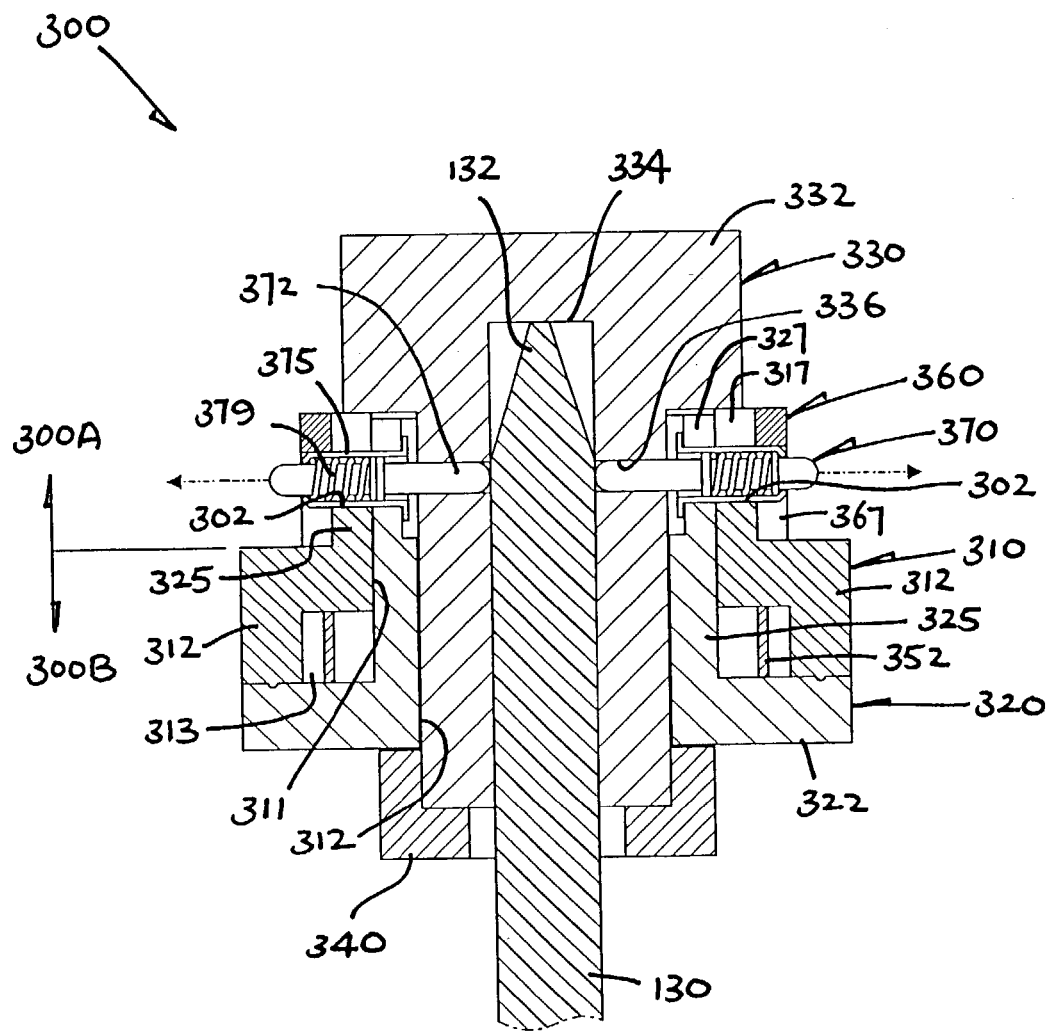

The invention will now be more particularly described, by way of example only, with reference to the accompanying drawings, in which:

FIG. 1 is a perspective view of an embodiment of a pepper grinder in accordance with the invention, said grinder having a lower pepper container and an upper salt container that are connectable together by a coupler;

FIG. 2 is a perspective view corresponding to FIG. 1, showing the containers and coupler separated;

FIG. 3 is a perspective view of the salt container of FIG. 2, with a connecting ring thereof separated;

FIG. 4 is an exposed perspective view of the coupler of FIG. 2;

FIGS. 5A and 5B are assembled and exposed perspective views of a locking pin of the coupler of FIG. 4; and FIGS. 6A and 6B are cross-sectional side views of the coupler of FIG. 4, showing how it interacts with a grinding shaft of the pepper container.

DETAILED DESCRIPTION OF PREFERRED EMBODIMENT

Referring to the drawings, there is shown a pepper grinder 10 embodying the invention, which grinder 10 comprises a plastic lower body 100 for containing pepper seeds, a plastic upper body 200 for containing salt, and a plastic coupler 300 releasably connecting the two bodies 100 and 200 co-axially together. Both bodies 100 and 200 are oblong upright bottles, which when connected one on top of the other together resemble a bowling pin, between which the coupler 300 is concealed.

The lower bottle 100 has opposite top and bottom ends 110 and 120. The top end 110 is circular and open acting as a mouth, through which the bottle 100 may be refilled with pepper seeds. The mouth 110 has a peripheral wall 112 that converges upwards. A pepper grinding mechanism (not shown) is installed in the bottom end 120, through which pepper ground by the grinding mechanism may be dispensed. The grinding mechanism includes a central operating shaft 130 that extends co-axially upwards through the bottle 100 and protrudes slightly out of the mouth 110. The shaft 130 is made of metal, having a uniform square cross-section over almost its entire length except a conical uppermost end 132.

The upper bottle 200 has opposite top and bottom ends 210 and 220. The top end 210 is open but closed by a circular apertured lid 212, through which salt may be dispensed. The apertures of the lid 212 are closable by an inner cover (not shown) that includes an upstanding pin 214 for turning the cover. The bottom end 220 is circular and open acting as a mouth, through which the bottle 200 may be refilled with salt. The mouth 220 has a peripheral wall 222, co-axially and just wholly within which a plastic connector ring 230 is fixed by keying and glue.

The connector ring 230 lies horizontally and is formed, on its inner surface, with a pair of diametrically opposed recesses 232 and, through its upper portion, with a pair of diametrically opposed U-shaped cutouts 236. Each recess 232 has an inverted L-shape when viewed from inside the ring 230, as formed by a solid step 234 at one bottom corner thereof.

The coupler 300 is formed, in part, by a pair of upper and lower horizontal annular members 310 and 320 and a generally cylindrical centerpiece 330 which extends downwardly through both members 310 and 320 and is secured thereto by a bottom ring 340 glued thereon. An enlarged head 332 of the centerpiece 330 co-acts with the bottom ring 340 to clamp the two members 310 and 320 together. The centerpiece 330 has a vertical central hole 334 having a blind top end inside the head 332 and includes a pair of small horizontal holes 336 that extends radially across the central hole 334 at a level just below the head 332. The central hole 334 has a square cross-section marginally larger than that of the grinding shaft 130, for the shaft 130 to pass through.

The upper coupler member 310 comprises a circular peripheral flange 312 and a cylindrical central collar 315 upstanding from the inner rim of the flange 312, together sharing a central hole 311 through which the centerpiece 330 extends. The flange 312 is formed with an annular space 313 co-axially within its lower half and four peripheral cutouts 314 equiangularly around the space 313. The cutouts 314 are leveled with and joined to the space 313, together opening downwards. The collar 315 includes, on its inner surface, a pair of diametrically opposed vertical ribs 316 and, through its upper end, a pair of diametrically opposed U-shaped cutouts 317.

The lower coupler member 320 has a circular peripheral flange 322 and a cylindrical central collar 325 upstanding from the inner rim of the flange 322, together sharing a central hole 321 through which the centerpiece 330 extends. The collar 325 includes, on its outer surface, a pair of diametrically opposed vertical grooves 326 and, through its upper end, a pair of diametrically opposed U-shaped cutouts 327.

The upper and lower coupler members 310 and 320 co-axially engage together, with the collar 325 of the latter passing upwardly through the central hole 311 of the former. Mating between the ribs 316 and the grooves 326 stops the two members 310 and 320 against relative turning, with their respective cutouts 317 and 327 in alignment. The annular space 313 and cutouts 314 of the upper coupler member 310 are closed from below by the flange 322 of the lower coupler member 320, in which a resiliently deformable plastic ring member 350 is loosely located.

The ring member 350 consists of a thin circular belt 352 and four integral knobs 354 protruding equiangularly from the belt 352. The belt 352 is loosely located in the annular space 313 such that the knobs 354, which normally project slightly out of the corresponding cutouts 314 (FIGS. 1 and 2) by virtue of resilience of the belt 352, are compressible inwards as permitted by resilient contraction of the belt 352.

The coupler 300 includes a connector ring 360 clamped co-axially between the centerpiece head 332 and the flange 312 of the upper coupler member 310, surrounding its collar 315. The ring 360 has, on its outer surface, a pair of diametrically opposite protruding blocks 362 and, through its lower portion, with a pair of diametrically opposed inverted U-shaped cutouts 367. Each block 332 has an inverted L-shape when viewed from outside the ring 360, as formed by a solid step 364 at one top corner thereof.

The connector ring 360 includes an inner surface key 368 immediately above each cutout 367, which engages in the open upper end of a respective cutout 317 of the collar 315. This fixes the ring 360 against relative rotation, whilst aligning the cutouts 367 and 317 and hence also the cutout 327 on each side. The closed ends of these cutouts 367, 317 and 327 on each side are overlapped to form a hole 302 (FIG. 6A) that locates a respective one of two locking pins 370 of the coupler 300.

Each locking pin 370 comprises a pin 371, an outer tube 375 and an internal compression coil spring 379. The pin 371 has opposite front and rear ends 372 and 373 and a circular flange 374 at mid-length. The rear pin end 373, on which the spring 379 is disposed, together with the flange 374, is inserted co-axially into the tube 375. Opposite front and rear ends 376 and 378 of the tube 375 are slightly restricted to retain the flange 374 and the rear end of the spring 379, such that the spring 379 resiliently biases the rear pin end 373 against extending out of the rear tube end 378. A circular flange 377 is formed around the front tube end 376.

Both locking pins 370 are located by their outer tubes 375 press-fitted rearwardly into respective holes 302 of the coupler 300, such that their front pin ends 372 point straight at each other. The two pin ends 372 pass through respective holes 336 of the centerpiece 330 to extend slightly into the central hole 334 thereof from opposite sides.

The coupler 300 has an upper part 300A, comprising the connector ring 360 and the centerpiece head 332, insertable from below into the mouth 220 of the upper bottle 200 for connection therewith. In particular, the coupler ring 360 has an outer shape marginally smaller than the inner shape of the mouth ring 230, and is connectable therein as a bayonet joint. The bayonet joint is effected through inter-engagement between the blocks 362 of the former and the recesses 232 of the latter by their respective steps 364 and 234. The blocks 362 should be inserted from below into the corresponding recesses 232 and then turned clockwise to connect, and can later be turned anti-clockwise and then pulled out to disconnect.

The coupler 300 acts as a plug or stopper closing the mouth 220 of the upper bottle 200. When the coupler 300 is in use, its locking pins 370 are aligned with the cutouts 236 of the connector ring 230 within the bottle mouth 220.

While the coupler 300 is connected to the upper bottle 200, its lower part 300B, comprising the two flanges 312 and 322 and knobs 354 and the bottom ring 340, is insertable like a plug into the mouth 110 of the lower bottle 100 for connection therewith. In particular, the coupler flanges 312 and 322, which have an outer diameter marginally smaller than the inner diameter of the mouth 110, are connectable therein through a snap action by the knobs 354 of the former engaging behind the peripheral wall 112 of the latter. Given that the knobs 354 are round on both upper and lower sides, they can be jammed into the mouth 110 past the rim of its peripheral wall 112 to connect behind it, and can later be pulled out to disconnect. As the mouth wall 112 is circular, the coupler 300 is and remains freely rotatable relative to the lower bottle 100.

During insertion of the lower coupler part 300B down into the mouth 110 of the lower bottle 100, its central hole 334 accommodates by receiving the uppermost end 132 of the grinding shaft 130 projecting upwards. Upon sufficient entry into the hole 334, the conical shaft end 132 wedges apart the two locking pins 370 on opposite sides in the coupler ring 360, by pushing their pins 371 rearwards against the springs 379 to extend their rear ends 373 out of the tubes 375 (FIG. 6B).

As a result, the pin ends 373 slot into and thus engage with the respective cutouts 236 of the connector ring 230 of the upper bottle mouth 220, thereby locking the two rings 360 and 230 together against relative turning. Thus, the connection of the bayonet joint between the coupler 300 and the upper bottle 200 is deadlocked or locked against release, for as long as the coupler 300 stays in connection to the lower bottle 100.

Given that the coupler 300 is fixed to the upper, salt bottle 200 through the deadlocked bayonet joint, the salt bottle 200 can be grasped and turned like a handle to rotate the shaft 130 via the coupler 300, thereby operating the grinding mechanism of the lower, pepper bottle 100. The salt bottle 200 can of course be used as a salt dispenser while connected to the pepper bottle 100. Whenever necessary, the salt bottle 200 can simply be pulled apart from the pepper bottle 100 to unplug the coupler 300, whereby the pepper bottle 100 is opened and can be refilled. The coupler 300 can only be unscrewed from the salt bottle 200 after it has been unplugged from the pepper bottle 100.

The coupler 300 acts as a closure means shared by and between the two bottles 100 and 200. While in use, the coupler 300 is surrounded by both bottle mouths 110 and 220 and is therefore fully concealed within the junction between the two bottles 100 and 200. The two mouths 110 and 200 have matching outer surfaces that lie flush with each other to form a neat appearance and for easy cleaning.

It is envisaged that the releasable inter-engagement between the coupler 300 and the pepper bottle 100 or the salt bottle 200 can be implemented by any other types of connection, such as screwing and/or sliding engagements.

The invention has been given by way of example only, and various other modifications and/or variations to the described embodiment may be made by persons skilled in the art without departing from the scope of the invention as specified in the accompanying claims.

The invention claimed is:

1. A pepper grinder comprising:
a first container for pepper seeds, the container having first and second openings, through which first opening the container may be refilled with pepper seeds, and including a pepper grinding mechanism provided in the second opening, through which pepper ground by the grinding mechanism may be dispensed;
a second container for salt, the container having first and second openings, through which first opening the container may be refilled with salt and through which second opening salt may be dispensed;
the two containers being releasably connected together at their first openings, with the result that each first opening closes the other first opening;
a coupler releasably connecting the two containers together, the coupler having a first part releasable connected with the first opening of the pepper container and a second part releasably connected with the first opening of the salt container.

2. A pepper grinder comprising:
a first container for pepper seeds, the container having first and second openings, through which first opening the container may be refilled with pepper seeds, and including a pepper grinding mechanism provided in the second opening, through which pepper ground by the grinding mechanism may be dispensed;
a second container for salt, the container having first and second openings, through which first opening the container may be refilled with salt and through which second opening salt may be dispensed;
the two containers being releasably connected together at their first openings with the result that both first openings are closed;
a coupler releasably connecting the two containers together, the coupler having a first part releasable connected with the first opening of the pepper container and a second part releasably connected with the first opening of the salt container, wherein the first openings of both containers have respective peripheral walls surrounding the corresponding parts of the coupler, such that the coupler is concealed within a junction between the two containers.

3. The pepper grinder as claimed in claim 1, wherein the first opening of the pepper container has a peripheral wall surrounding the first part of the coupler, and the peripheral wall and the first coupler part have inter-engageable means releasably connecting the pepper container and the coupler together.

4. The pepper grinder as claimed in claim 3, wherein the inter-engageable means comprises a fixed member and a resiliently biased movable member engageable with the fixed member through a snap action.

5. The pepper grinder as claimed in claim 4, wherein the fixed member is provided by a rim of the peripheral wall, and the movable member is supported by the first coupler part for movement and is resiliently biased to protrude from the coupler part.

6. The pepper grinder as claimed in claim 1, wherein the first opening of the salt container has a peripheral wall surrounding the second part of the coupler, and the peripheral wall and the second coupler part have inter-engageable means releasably connecting the salt container and the coupler together.

7. The pepper grinder as claimed in claim 6, wherein the inter-engageable means comprises two fixed members engageable with each other through relative turning.

8. The pepper grinder as claimed in claim 7, wherein the two fixed members are engageable with each other as a bayonet joint.

9. The pepper grinder as claimed in claim 1, wherein the connection between the salt container and the coupler is fixed against relative rotation, and the connection between the coupler and the pepper container permits relative rotation, and wherein the grinding mechanism includes an operating shaft engageable with the coupler for rotation relative to the pepper container by the coupler rotating with the salt container.

10. A pepper grinder comprising:
a first container for pepper seeds, the container having first and second openings, through which first opening the container may be refilled with pepper seeds, and including a pepper grinding mechanism provided in the second opening, through which pepper ground by the grinding mechanism may be dispensed;

a second container for salt, the container having first and second openings, through which first opening the container may be refilled with salt and through which second opening salt may be dispensed;

the two containers being releasably connected together at their first openings, with the result that each first opening closes the other first;

a coupler releasably connecting the two containers together, the coupler having, a first part releasably connected with the first opening of the pepper container and a second part releasably connected with the first opening of the salt container, wherein the coupler includes a locking member movable to lock the connection between the salt container and the coupler against release in response to making a connection between the coupler and the pepper container.

11. The pepper grinder as claimed in claim 10, wherein the grinding mechanism includes an operating shaft engageable with the coupler for rotation relative to the pepper container by the coupler rotating with the salt container, and the locking member is movable to lock by the operating shaft upon engaging with the coupler.

12. The pepper grinder as claimed in claim 10, wherein the grinding mechanism includes an operating shaft engageable with the coupler for rotation relative to the pepper container by the coupler rotating with the salt container, and the locking member is movable by the operating shaft upon engaging with the coupler.

13. The pepper grinder as claimed in claim 12, wherein the shaft has a tapered end arranged to move the locking member through a wedging action.

14. The pepper grinder as claimed in claim 1, wherein the pepper container has an oblong upright body having an upper end as its first opening, and the salt container has an oblong upright body having a lower end as its first opening.

15. A pepper grinder comprising:

a first container for pepper seeds, the container having first and second openings, through which first opening the container may be refilled with pepper seeds, and including a pepper grinding mechanism provided in the second opening, through which pepper ground by the grinding mechanism may be dispensed;

a second container for salt, the container having first and second openings, through which first opening the container may be refilled with salt and through which second opening salt may be dispensed;

the two containers being releasably connected together at their first openings, with the result that both first openings are closed;

a coupler releasably connecting the two containers together, the coupler having a first part releasably connected with the first opening of the pepper container and a second part releasably connected with the first opening of the salt container, wherein the coupler includes a locking member movable to lock the connection between the salt container and the coupler against release in response to making a connection between the coupler and the pepper container, and wherein the first openings of both containers have respective peripheral walls surrounding the corresponding parts of the coupler, such that the coupler is concealed within a junction between the two containers.

16. The pepper grinder as claimed in claim 1, wherein the second openings of each container are at opposite ends of the pepper grinder.

17. The pepper grinder as claimed in claim 2, wherein the second openings of each container are at opposite ends of the pepper grinder.

18. The pepper grinder as claimed in claim 10, wherein the second openings of each container are at opposite ends of the pepper grinder.

19. The pepper grinder as claimed in claim 15, wherein the second openings of each container are at opposite ends of the pepper grinder.

* * * * *